United States Patent
Kumar et al.

(10) Patent No.: US 12,406,149 B2
(45) Date of Patent: Sep. 2, 2025

(54) SYSTEM AND METHOD FOR INTENT DISCOVERY FROM USER LOGS USING DEEP SEMI-SUPERVISED CONTRASTIVE CLUSTERING

(71) Applicant: Tata Consultancy Services Limited, Mumbai (IN)

(72) Inventors: Rajat Kumar, Bangalore (IN); Gautam Shroff, Noida (IN); Mayur Patidar, Noida (IN); Lovekesh Vig, Noida (IN); Vaibhav Varshney, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 258 days.

(21) Appl. No.: 18/215,939

(22) Filed: Jun. 29, 2023

(65) Prior Publication Data

US 2024/0013006 A1    Jan. 11, 2024

(30) Foreign Application Priority Data

Jul. 6, 2022   (IN) .............................. 202221038929

(51) Int. Cl.
  *G06F 40/35* (2020.01)
  *G06F 18/213* (2023.01)
  (Continued)

(52) U.S. Cl.
  CPC .............. *G06F 40/35* (2020.01); *G06F 18/24* (2023.01); *G06F 40/30* (2020.01); *G06N 3/08* (2013.01);
  (Continued)

(58) Field of Classification Search
  None
  See application file for complete search history.

(56) References Cited

U.S. PATENT DOCUMENTS 11,487,948 B2 *  11/2022  Kaur ...................... G06F 40/289
12,026,467 B2 *  7/2024   Arya ...................... G06F 40/289
(Continued)

FOREIGN PATENT DOCUMENTS

CN    1130313154 B    12/2021

OTHER PUBLICATIONS

Yassine Ouali; Céline Hudelot; Myriam Tami; An Overview of Deep Semi-Supervised Learning; Jul. 6, 2020; URL: https://arxiv.org/pdf/2006.05278 (Year: 2020).*

Dominik Stammbach, Elliott Ash; DOCSCAN: Unsupervised Text Classification via Learning from Neighbors; May 11, 2021; URL: https://arxiv.org/pdf/2105.04024v2 (Year: 2021).*

Ajay Chatterjee, Shubhashis Sengupta; Intent Mining from past conversations for conversational agent; Jan. 18, 2021; URL: https://arxiv.org/pdf/2005.11014 (Year: 2021).*

(Continued)

*Primary Examiner* — Richa Sonifrank
(74) *Attorney, Agent, or Firm* — Finnegan, Henderson, Farabow, Garrett & Dunner, LLP (57) ABSTRACT

Existing semi-supervised and unsupervised approaches for intent discovery require an estimate of the number of new intents present in the user logs. The present disclosure receives labeled utterances from known intents and update parameters of a pre-trained language model (PLM). Representation learning and clustering is performed iteratively using labeled and unlabeled utterances from known intents and unlabeled utterances from unknown intents to fine-tune PLM and a plurality of clusters is generated. Cluster merger algorithm is executed iteratively on generated plurality of clusters. A query cluster is obtained by randomly selecting one cluster from the plurality of clusters and by obtaining a corresponding plurality of nearest neighbors based on a cosine-similarity. A response for merging the query cluster and corresponding plurality of nearest neighbors is obtained, and a new cluster is created. The corresponding cluster representation is recalculated and each of the new cluster is interpreted as an intent.

18 Claims, 7 Drawing Sheets

(51) Int. Cl.
  *G06F 18/23*    (2023.01)
  *G06F 18/24*    (2023.01)
  *G06F 40/20*    (2020.01)
  *G06F 40/30*    (2020.01)
  *G06N 3/08*     (2023.01)
  *G06N 3/0895*   (2023.01)
  *G06N 20/00*    (2019.01)
  *G06N 20/20*    (2019.01)
  *G10L 15/065*   (2013.01)
  *G10L 15/18*    (2013.01)
  *G06N 3/045*    (2023.01)

(52) U.S. Cl.
  CPC .......... *G06N 3/0895* (2023.01); *G10L 15/065* (2013.01); *G10L 15/1822* (2013.01); *G06F 18/213* (2023.01); *G06F 18/23* (2023.01); *G06F 40/20* (2020.01); *G06N 3/045* (2023.01); *G06N 20/00* (2019.01); *G06N 20/20* (2019.01)

(56) References Cited

U.S. PATENT DOCUMENTS

| | | | | |
|---|---|---|---|---|
| 12,099,816 | B2* | 9/2024 | Jalaluddin | G06F 40/295 |
| 2020/0279556 | A1 | 9/2020 | Gruber et al. | |
| 2023/0086302 | A1* | 3/2023 | Bhagavath | G10L 15/22 |
| | | | | 704/9 |
| 2023/0222290 | A1* | 7/2023 | Sen | G06N 3/044 |
| | | | | 704/9 |
| 2024/0013006 | A1* | 1/2024 | Kumar | G06F 40/35 |

OTHER PUBLICATIONS

Nikhita Vedula, Rahul Gupta, Aman Alok, Mukund Sridhar; Automatic Discovery of Novel Intents & Domains from Text Utterances; May 22, 2020; https://arxiv.org/pdf/2006.01208 (Year: 2020).*

Chandni Magoo, Dr. Manjeet Singh; An Implemented review for Intent Creation using different Clustering Techniques; Jul. 8-9, 2022; URL https://ieeexplore.ieee.org/document/9913605?source=IQplus (Year: 2022).*

Anonymous ACL submission, "UNICON: Unsupervised Intent Discovery via Semantic-level Constrastive Learning," (2021).

Anonymous Author(s), "Intent Discovery With or Without Labeled Data Using Dependency Parser," (2019).

Lair et al., "User-in-the-loop Adaptive Intent Detection for Instructable Digital Assistant," (2020).

Lin et al., "Discovering New Intents via Constrained Deep Adaptive Clustering with Cluster Refinement," (2019).

Shen et al., "Semi-supervised Intent Discovery with Contrastive Learning," Proceedings of the Third Workshop on Natural Language Processing for Conversational AI, pp. 120-129 (2021).

Vedula et al., "ADVIN: Automatically Discovering Novel Domains and Intents from User Text Utterances," (2022).

Wei et al., "Semi-Supervised Clustering Contrastive Learning for Discovering New Intents," (2022).

Zhang et al., "Discovering New Intents with Deep Aligned Clustering," (2021).

* cited by examiner

For labeled utterance, $u_t$ : $u_{t1}$ and $u_{t2}$ are utterances from same intent For unlabeled utterance, $u_t$ : $u_{t1}$ and $u_{t2}$ are generated by contextual augmentor

SYSTEM AND METHOD FOR INTENT DISCOVERY FROM USER LOGS USING DEEP SEMI-SUPERVISED CONTRASTIVE CLUSTERING

PRIORITY CLAIM

This U.S. patent application claims priority under 35 U.S.C. § 119 to: Indian Patent Application No. 202221038929, filed on Jul. 6, 2022. The entire contents of the aforementioned application are incorporated herein by reference.

TECHNICAL FIELD

The disclosure herein generally relates to the field of intent detection, and, more particularly, to a system and method for intent discovery from user logs using deep semi-supervised contrastive clustering.

BACKGROUND

Intent detection is a crucial component of dialogue systems wherein the objective is to classify a user utterance into one of the multiple pre-defined intents. A pre-requisite for developing an effective intent identifier is a training dataset labeled with all possible user intents.

Intent detection is typically modeled as a multi-class classification problem wherein labeled data comprising of utterances for each known intent is manually created by domain experts. However, most real-world applications must cope with evolving user needs and new functionality. Further the new functionality is routinely introduced into the dialogue system resulting in a continuously increasing number of intents over time. Even for seasoned domain experts estimating future user requirements at design time is challenging and these often have to be discovered from recent user logs which contain information corresponding to past user utterances, model response predicted, implicit, and explicit feedback.

Several classical and deep learning-based clustering methods have been used for intent discovery. One of the existing works described modelling intent discovery from unlabeled utterances as an unsupervised clustering problem and further proposed a variant of density-based spatial clustering of applications with noise (DBSCAN) for clustering, but the proposed work do not employ any representation learning and rely heavily on manual evaluation. Another existing work used a contrastive learning based unsupervised approach for joint representation learning and clustering wherein performance largely depended on the quality of an auxiliary target distribution. One another existing works proposed Deep-Aligned approach for intent detection and discovery which alternately performed representation learning and clustering by utilizing pseudo-labeled data obtained from clustering for representation learning. Deep-Aligned approach used k-means as the clustering algorithm of choice and updated a Bidirectional Encoder Representations from Transformers (BERT) backbone's parameters in the process. As k-means may assign different cluster identifiers (IDs) to the same set of data points over different iterations the authors proposed an alignment algorithm to align clusters obtained in consecutive epochs. Thus, an incorrect cluster alignment over epochs may lead to a significant drop in clustering accuracy. Additionally, they make the unrealistic assumption of a uniform distribution over intents to estimate the number of intents.

Existing semi-supervised approaches and some unsupervised approaches for intent discovery require an estimate of the number of new intents (m) present in the user logs. Incorrect estimates for m can lead to noisy clusters (i.e., a cluster which contains utterances from multiple intents), which then require substantial manual effort to split cleanly. Unsupervised approaches often lead to a large number of clusters due to poor semantic utterance representations.

SUMMARY

Embodiments of the present disclosure present technological improvements as solutions to one or more of the above-mentioned technical problems recognized by the inventors in conventional systems. For example, in one embodiment, a method for intent discovery from user logs using deep semi-supervised contrastive clustering is provided. The method includes receiving, via one or more hardware processors, a plurality of labeled utterances specific to a plurality of known intents obtained from a domain expert; updating, via the one or more hardware processors, one or more parameters of a pre-trained language model (PLM) based on the received plurality of labeled utterances to obtain a fine-tuned pre-trained language model (PLM) by minimizing a cross-entropy loss over a batch B of size N consisting of the plurality of labeled utterances; iteratively performing, via the one or more hardware processors, a representation learning and clustering using the plurality of labeled utterances and a plurality of unlabeled utterances from the plurality of known intents and the plurality of unlabeled utterances from a plurality of unknown intents for: (i) fine-tuning the pre-trained language model (PLM) using a combination of a semi-supervised contrastive loss at an utterance level and the cross-entropy loss; and (ii) generating a plurality of clusters by running a clustering algorithm wherein, the plurality of clusters comprises an outlier cluster and wherein, each of the cluster of the plurality of clusters comprises of a corresponding cluster representation; executing, via the one or more hardware processors, a cluster merger algorithm iteratively on the generated plurality of clusters based on a plurality of cluster definitions, wherein a plurality of p utterances from each of the plurality of clusters are used as a plurality of cluster definitions comprising: (i) obtaining a query cluster (q) by randomly selecting one cluster from the plurality of clusters and obtaining a corresponding plurality of nearest neighbors based on a cosine-similarity, wherein the cosine-similarity is determined between the cluster representation of the query cluster (q) and the corresponding cluster representation of the plurality of clusters; (ii) obtaining a response for merging the query cluster (q) and the corresponding plurality of nearest neighbors and creating one or more new clusters based on the response; and (iii) recalculating the corresponding cluster representation and assigning a cluster definition of the query cluster (q) to the one or more new clusters; and interpreting, via the one or more hardware processors, each of the one or more new clusters as an intent and training a logistic classifier based on the intent to obtain the plurality of labelled utterances that belong to the outlier cluster.

In another aspect, there is provided a system for intent discovery from user logs using deep semi-supervised contrastive clustering. The system comprises: a memory storing instructions; one or more communication interfaces; and one or more hardware processors coupled to the memory via the one or more communication interfaces, wherein the one or more hardware processors are configured by the instructions to: receive a plurality of labeled utterances specific to a plurality of known intents obtained from a domain expert. The system further comprises updating one or more parameters of a pre-trained language model (PLM) based on the received plurality of labeled utterances to obtain a fine-tuned pre-trained language model (PLM) by minimizing a cross-entropy loss over a batch B of size N consisting of the plurality of labeled utterances; iteratively performing a representation learning and clustering using the plurality of labeled utterances and a plurality of unlabeled utterances from the plurality of known intents and the plurality of unlabeled utterances from a plurality of unknown intents for: (i) fine-tuning the pre-trained language model (PLM) by using a combination of a semi-supervised contrastive loss at an utterance level and the cross-entropy loss; and (ii) generating a plurality of clusters by running a clustering algorithm wherein, the plurality of clusters comprises an outlier cluster and wherein, each of the cluster of the plurality of clusters comprises of a corresponding cluster representation; execute a cluster merger algorithm iteratively on the generated plurality of clusters based on a plurality of cluster definitions, wherein a plurality of p utterances from each of the plurality of clusters are used as a plurality of cluster definitions comprising: (i) obtaining a query cluster (q) by randomly selecting one cluster from the plurality of clusters and obtaining a corresponding plurality of nearest neighbors based on a cosine-similarity, wherein the cosine-similarity is determined between the cluster representation of the query cluster (q) and the corresponding cluster representation of the plurality of clusters; (ii) obtaining a response for merging the query cluster (q) and the corresponding plurality of nearest neighbors and creating one or more new clusters based on the response; and (iii) recalculating the corresponding cluster representation and assigning a cluster definition of the query cluster (q) to the one or more new clusters; and interpret each of the one or more new clusters as an intent and training a logistic classifier based on the intent to obtain the plurality of labelled utterances that belong to the outlier cluster.

In yet another aspect, there are provided one or more non-transitory machine-readable information storage mediums comprising one or more instructions which when executed by one or more hardware processors cause receiving a plurality of labeled utterances specific to a plurality of known intents obtained from a domain expert; updating one or more parameters of a pre-trained language model (PLM) based on the received plurality of labeled utterances to obtain a fine-tuned pre-trained language model (PLM) by minimizing a cross-entropy loss over a batch B of size N consisting of the plurality of labeled utterances; iteratively performing a representation learning and clustering using the plurality of labeled utterances and a plurality of unlabeled utterances from the plurality of known intents and the plurality of unlabeled utterances from a plurality of unknown intents for: (i) fine-tuning the pre-trained language model (PLM) by using a combination of a semi-supervised contrastive loss at an utterance level and the cross-entropy loss; and (ii) generating a plurality of clusters by running a clustering algorithm wherein, the plurality of clusters comprises an outlier cluster and wherein, each of the cluster of the plurality of clusters comprises of a corresponding cluster representation; execute a cluster merger algorithm iteratively on the generated plurality of clusters based on a plurality of cluster definitions, wherein a plurality of p utterances from each of the plurality of clusters are used as a plurality of cluster definitions comprising: (i) obtaining a query cluster (q) by randomly selecting one cluster from the plurality of clusters and obtaining a corresponding plurality of nearest neighbors based on a cosine-similarity, wherein the cosine-similarity is determined between the cluster representation of the query cluster (q) and the corresponding cluster representation of the plurality of clusters; (ii) obtaining a response for merging the query cluster (q) and the corresponding plurality of nearest neighbors and creating one or more new clusters based on the response; and (iii) recalculating the corresponding cluster representation and assigning a cluster definition of the query cluster (q) to the one or more new clusters; and interpret each of the one or more new clusters as an intent and training a logistic classifier based on the intent to obtain the plurality of labelled utterances that belong to the outlier cluster.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure provides a system and method for intent discovery from user logs using deep semi-supervised contrastive clustering. The present disclosure and the method described herein implement a two-phase algorithm for intent detection and discovery from user logs. In the first phase of method/algorithm, one or more parameters of a pre-trained language model (PLM) are updated based on labeled data from known intents. In the second phase, the present method iteratively performs representation learning and clustering to fine-tune the pre-trained language model (PLM) by using a combination of a semi-supervised contrastive loss and a cross-entropy loss and generates a plurality of clusters by running a clustering algorithm. Further the present disclosure performs/executes a cluster merger algorithm iteratively on the generated plurality of clusters to obtain one or more new clusters, wherein each of the one or more new clusters is interpreted as an intent.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

Figure 1:
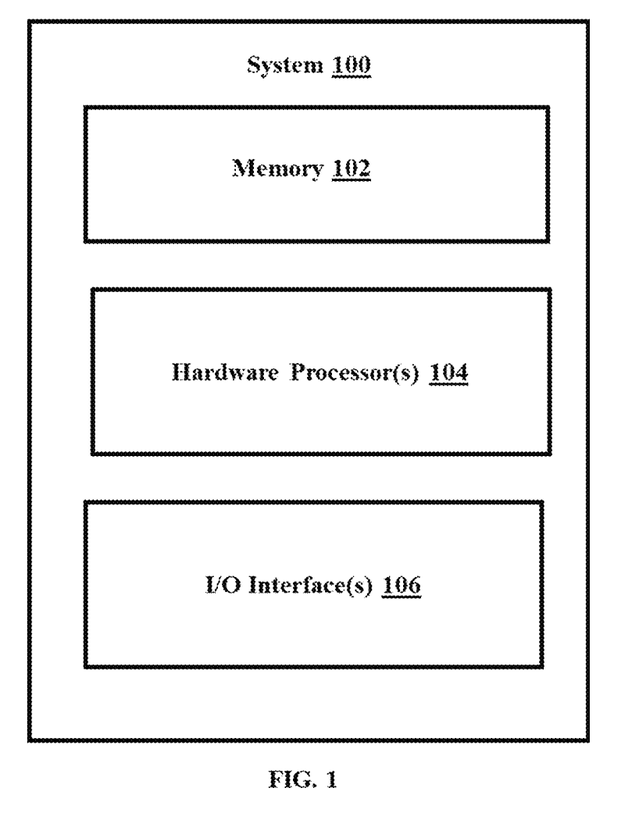
FIG. 1 illustrates an exemplary system for intent discovery from user logs using deep semi-supervised contrastive clustering, according to some embodiments of the present disclosure.

FIG. 1 illustrates an exemplary system 100 for intent discovery from user logs using deep semi-supervised contrastive clustering, according to some embodiments of the present disclosure. In an embodiment, the system 100 includes one or more processors 104, communication interface device(s) or input/output (I/O) interface(s) 106, one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
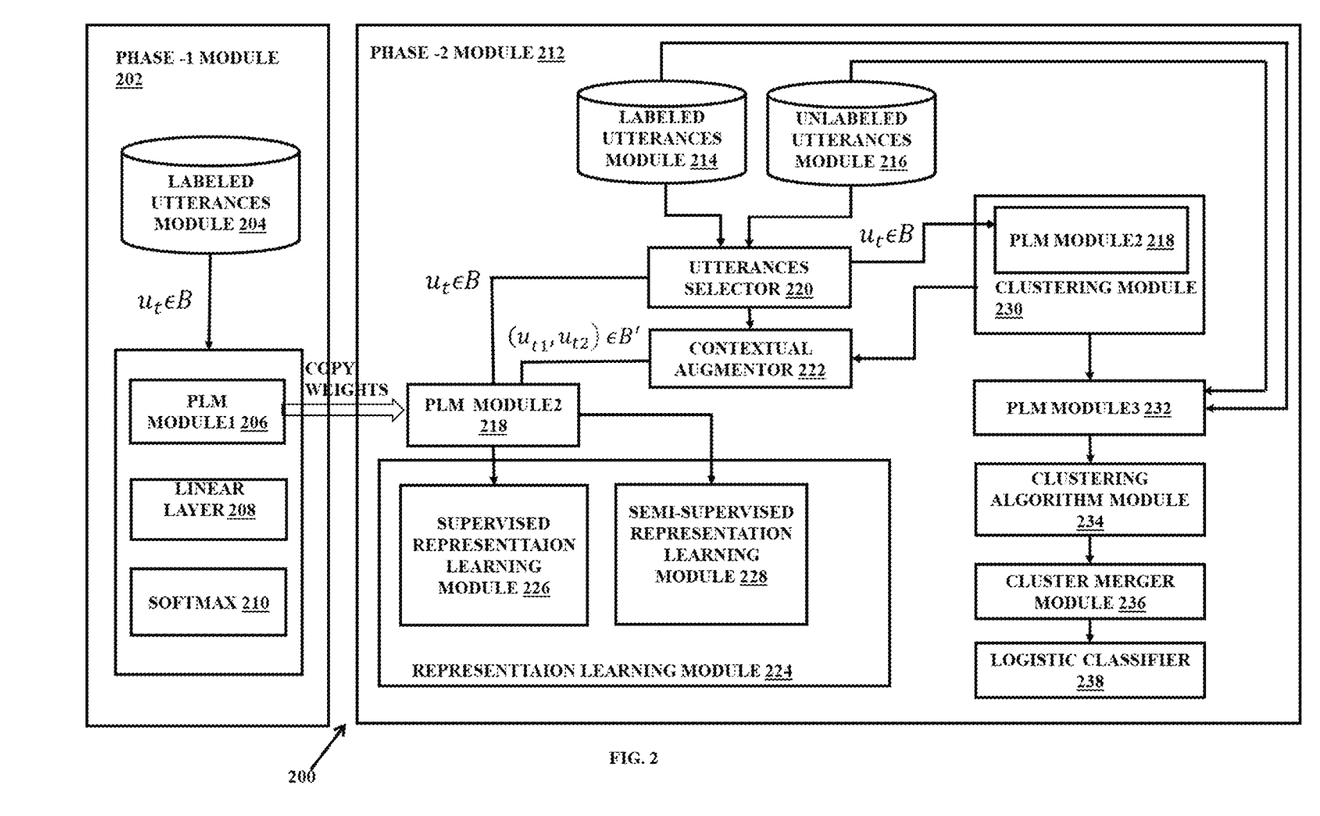
FIG. 2 illustrates a functional block diagram of the system for intent discovery from user logs using deep semi-supervised contrastive clustering, according to some embodiments of the present disclosure.

FIG. 2, with reference to FIG. 1, illustrates a functional block diagram of the system for intent discovery from user logs using deep semi-supervised contrastive clustering, according to some embodiments of the present disclosure. In an embodiment, the system 200 includes a phase-1 module 202 and a phase-2 module 212. The phase-1 module 202 comprises a labeled utterances module 204, a pre-trained language model (PLM) module1 206, a linear layer 208 and a softmax 210. The phase-2 module 212 comprises of a labeled utterances module 214, an unlabeled utterances module 216, a PLM module2 218, an utterances selector 220, a contextual augmentor 222, a representation learning module 224, a clustering module 230 comprising the PLM module2 218. The phase-2 module 212 further comprises a PLM module3 232, a clustering algorithm module 234, a cluster merger module 236 and a logistic classifier 238. The representation learning module 224 comprises of a supervised representation learning module 226 and a semi-supervised learning module 228.

Figure 3A:
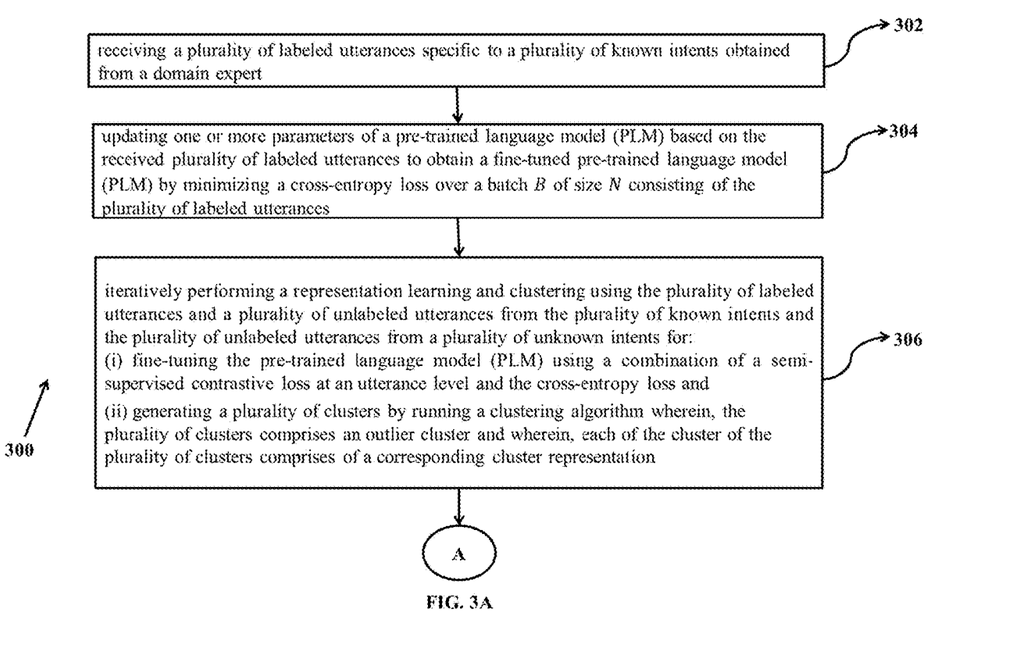
FIGS. 3A and 3B are flow diagrams illustrating the steps involved in the method for intent discovery from user logs using deep semi-supervised contrastive clustering, according to some embodiments of the present disclosure.
Figure 3B:
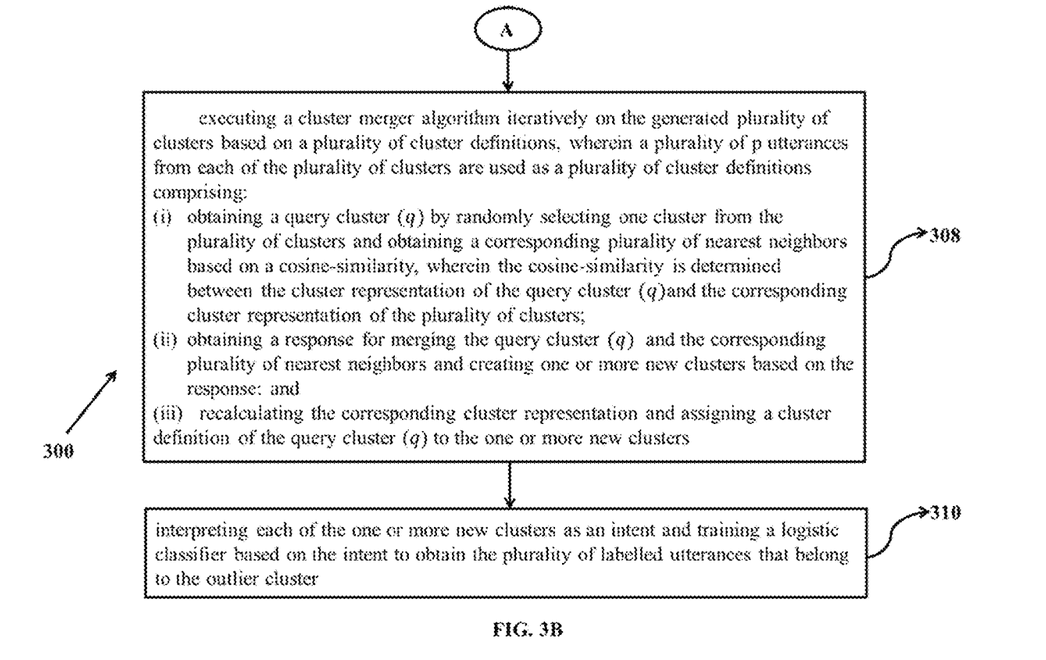

FIGS. 3A and 3B are flow diagrams illustrating a processor implemented method for intent discovery from user logs using deep semi-supervised contrastive clustering using the system of FIG. 1, according to some embodiments of the present disclosure. Steps of the method of FIG. 3 shall be described in conjunction with the components of FIG. 2. At step 302 of the method 300, the one or more hardware processors 104 receive a plurality of labeled utterances specific to a plurality of known intents obtained from a domain expert as depicted by the labeled utterances module 204.

At step 304 of the method 300, the one or more hardware processors 104 update one or more parameters of a pre-trained language model (PLM) represented by the PLM module1 206, based on the received plurality of labeled utterances to obtain a fine-tuned pre-trained language model (PLM) represented by the PLM module2 218 by minimizing a cross-entropy loss over a batch B of size N consisting of the plurality of labeled utterances. The one or more parameters of a pre-trained language model (PLM) includes one or more real valued vectors.

Phase-1: Fine-tuning of PLM using labeled utterances from known intents:

To leverage the plurality of labeled utterances from the plurality of known intents for intent detection and discovery, the present disclosure uses the plurality of labeled utterances in the phase-1 (represented by phase-1 module 202 of 200) of the method to update the parameters of the PLM (represented by PLM module1 206), as shown in phase-1 module 202 of FIG. 2. In an embodiment of the present disclosure, the PLM module1 206 is fine-tuned by minimizing the cross-entropy loss over the batch B of size N consisting of the plurality of labeled utterances from the plurality of known intents, as shown in Eq. 1 and 2.

$$p(I_{known}^i \mid u_t) = \text{softmax}(h_t * W + b) \quad (1)$$

$$L_{CE} = -\frac{1}{N} \sum_{t \in B} \sum_{i=1}^{n} y \cdot \log(p(I_{known}^i \mid u_t)) \quad (2)$$

In equation (1), $h_t$ denotes a d-dimensional representation of the $t^{th}$ utterance ($u_t$) in the batch B obtained from the PLM module1 206 and $W \in R^{d*m}$, b represents the bias and W represents the weights of a linear layer 208 respectively. In equation (2), $p(l_{known}^i \mid u_t)$ denotes the probability of assigning $u_t$ to the $i^{th}$ known intent and γ is 1 only for the true intent and zero otherwise. After fine-tuning the PLM module1 206 on the plurality of labeled utterances, the linear layer 208 is discarded, and the PLM module1 206 is used with updated weights in the phase-2. The functionality of the linear layer 208 is to transform input features into output features using a weight matrix. The softmax 210 is an activation function used in the output layer of neural network models that predict a multinomial probability distribution.

At step 306 of the method 300, the one or more hardware processors 104 iteratively perform a representation learning and clustering using the plurality of labeled utterances and a plurality of unlabeled utterances from the plurality of known intents and the plurality of unlabeled utterances from a plurality of unknown intents for:
(i) fine-tuning the pre-trained language model (PLM) using a combination of a semi-supervised contrastive loss at an utterance level and the cross-entropy loss; and
(ii) generating a plurality of clusters by running a clustering algorithm wherein, the plurality of clusters comprises an outlier cluster and wherein, each of the cluster of the plurality of clusters comprises of a corresponding cluster representation.

In the phase-2 (represented by phase-2 module 212 of 200) of the method of the present disclosure, both the plurality of labeled utterances and the plurality of unlabeled utterances are used to perform representation learning represented by the representation learning module 224 and clustering represented by the clustering module 230 alternatively via semi-supervised contrastive learning. Examples of the plurality of labeled utterances include "I want to activate my new card" and "How do I link a new card in the app" wherein the corresponding plurality of known intents includes "Activate My Card" and "Card Linking". Examples of the plurality of labeled utterances include "The ATM did not return my card", "The ATM sucked my card", "My card has gone missing" and "My card was stolen". The utterances selector 220 of 200 comprises of a batch of labeled and unlabeled utterances that are randomly selected from the labeled utterances module 214 and the unlabeled utterances module 216. In an embodiment of the present disclosure, the representation learning is performed to obtain a fine-tuned PLM (represented by PLM module2 218) by using a combination of the cross-entropy loss and a semi-supervised contrastive loss. The supervised representation learning module 226 of the representation learning module 224 is configured to maintain the weights of the PLM from phase-1 (represented by PLM module 206 of 200) wherein the supervised representation learning module 226 comprises of the cross-entropy loss. The semi-supervised representation learning module 228 of the representation learning module 224 is configured to obtain better representation of utterances using a semi-supervised contrastive loss. In an embodiment of the present disclosure, the representation learning is performed by the representation learning module 224 to obtain a fine-tuned PLM (represented by PLM module2 218) by using a combination of the cross-entropy loss and the semi-supervised contrastive loss.

Figure 4:
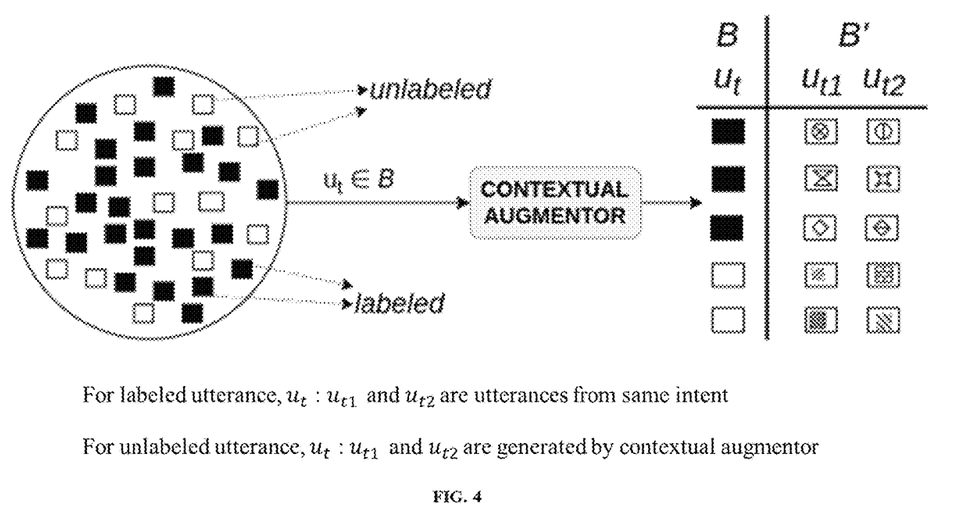
FIG. 4 illustrates utterance augmentations for semi-supervised contrastive learning in conjunction with the method for intent discovery from user logs using deep semi-supervised contrastive clustering, according to some embodiments of the present disclosure.

To maintain intent detection accuracy on the plurality of known intents, representations are updated by minimizing the cross-entropy loss on the plurality of labeled utterances from the plurality of known intents. As mentioned above, in addition to the plurality of labeled of utterances shown in the labeled utterances module 214 from the plurality of known intents, the present disclosure uses the plurality of unlabeled utterances (represented by the unlabeled utterances module 216) from both the plurality of known intents and the plurality of unknown intents to improve performance on intent detection and discovery, as shown in phase-2 module 212 of FIG. 2. Further, to learn better representations, the distance between utterances belonging to the same intent is minimized. Conversely, the distance between the utterances corresponding to different intents is maximized. In contrast to self-supervised or supervised contrastive learning (known in the art), for semi-supervised learning the batch B of size N may contain both the plurality of labeled and the plurality of unlabeled utterances. As shown in FIG. 4, similar to self-supervised contrastive learning (known in the art), the present disclosure creates a pair of augmentations ($u_{t1}$, $u_{t2}$) or positive pairs corresponding to the $t^{th}$ or anchor utterance ($u_t$) in B to obtain B', which contains two augmented utterances corresponding to each utterance in B represented by the contextual augmentor 222 of 200. Further, to generate augmentations for a labeled utterance, the present disclosure (or the one or more hardware processors 104) randomly samples two utterances from the same intent and use them as augmentations whereas for an unlabeled utterance, the present disclosure (or the one or more hardware processors 104) generates two augmented pairs by performing a contextual augmentation (known in the art), as depicted in FIG. 4. In the contextual augmentation, given an utterance, the present disclosure (or the one or more hardware processors 104) randomly masks a few words and use Bidirectional Encoder Representations from Transformers (BERT's) masked-language modeling (MLM) objective to generate words corresponding to masked positions. If $u_{t1}$, $u_{t2}$ are augmentations of a labeled utterance $u_t$ then $P(u_{t1})$ is defined as the set of utterances belonging to the same intent as $u_{t1}$ in B' whereas $N(u_{t1})$ containing all 2N−1 utterances excluding $u_{t1}$ (note that $N(u_t)$ and $P(u_t)$) may have utterances in common). If $u_{t1}$, $u_{t2}$ are augmentations of an unlabeled utterance $u_t$ then $P(u_{t1})$ contains $u_{t2}$ only and $N(u_{t1})$ contains all 2N−1 utterances excluding $u_{t1}$. The present disclosure (or the one or more hardware processors 104) updates the one or more parameters of the PLM (represented by PLM module2 218) by minimizing the instance level Semi-Supervised Contrastive (SSC) loss as shown in Equation. 3.

$$L'_{ssc} = \sum_{t \in B'} \frac{-1}{P(u_t) \vee} \sum_{p' \in P(u_t)} \log \frac{\exp(u_t \cdot u_{p'}/\tau)}{\sum_{a \in N(t)} \exp(u_t \cdot u_a/\tau)} \quad (3)$$

In equation (3), (·) symbol and τ denote dot product and scalar temperature parameter respectively.

In an embodiment of the present disclosure, to maintain intent detection accuracy on the plurality of known intents, the PLM parameters are updated by minimizing cross-entropy loss over labeled utterances from the plurality of known intents, as shown in equation (4) where γ is 1 only for the target intent and zero otherwise. Unlike in phase-1, B can contain the plurality of labeled and unlabeled utterances from the plurality of known intents and the plurality of unlabeled utterances from the plurality of unknown intents but the plurality of unlabeled utterances are during back propagation. Final objective function is shown in equation (5).

$$L_{srl} = -\frac{1}{N} \sum_{\tau \in B} \sum_{i=1}^{n} y \cdot \log p(I^i | u_t) \quad (4)$$

$$L = L'_{ssc} + L_{srl} \quad (5)$$

At step 308 of the method 300, the one or more hardware processors 104 execute a cluster merger algorithm iteratively (or perform iterative clustering) on the generated plurality of clusters based on a plurality of cluster definitions, wherein a plurality of p utterances from each of the plurality of clusters are used as a plurality of cluster definitions comprising:

(i) obtaining a query cluster (q) by randomly selecting one cluster from the plurality of clusters and obtaining a corresponding plurality of nearest neighbors based on a cosine-similarity, wherein the cosine-similarity is determined between the cluster representation of the query cluster (q) and the corresponding cluster representation of the plurality of clusters;

(ii) obtaining a response for merging the query cluster (q) and the corresponding plurality of nearest neighbors and creating one or more new clusters based on the response; and (iii) recalculating the corresponding cluster representation and assigning a cluster definition of the query cluster (q) to the one or more new clusters.

In the present disclosure, as described in phase -2, the representation learning, and clustering are performed in an alternate manner or iteratively. After phase-2, fine-tuned PLM is obtained which is represented by the PLM module3 232 of 200. Further, the plurality of clusters along with an outlier cluster is generated by running the clustering algorithm (represented by the clustering algorithm module 234) on the fine-tuned PLM (represented by the PLM module3 232). The clustering algorithm or step of clustering includes a density-based spatial clustering of applications with noise (DBSCAN) algorithm. The present disclosure (or the system 100) assumes that the utterances which are part of the same cluster belong to the same intent and use this fact to create a pair of augmentations for a given utterance along with contextual augmentation. Due to the unknown value of m, semi-supervised contrastive representation learning is performed at the utterance level, as shown in equation (4). In an embodiment of the present disclosure, the cluster merging algorithm is executed iteratively on the generated plurality of clusters as represented by the cluster merger module 236. The details of the cluster merger algorithm are explained later.

At step 310 of the method 300, the one or more hardware processors 104 interpret each of the one or more new clusters as an intent and train a logistic classifier based on the intent to obtain the plurality of labelled utterances that belong to the outlier cluster which is represented by the logistic classifier module 238 of 200.

FIG. 4 illustrates utterance augmentations for semi-supervised contrastive learning in conjunction with the method for intent discovery from user logs using deep semi-supervised contrastive clustering, according to some embodiments of the present disclosure. The details of the utterance augmentations are explained in the earlier sections.

Figure 5A:
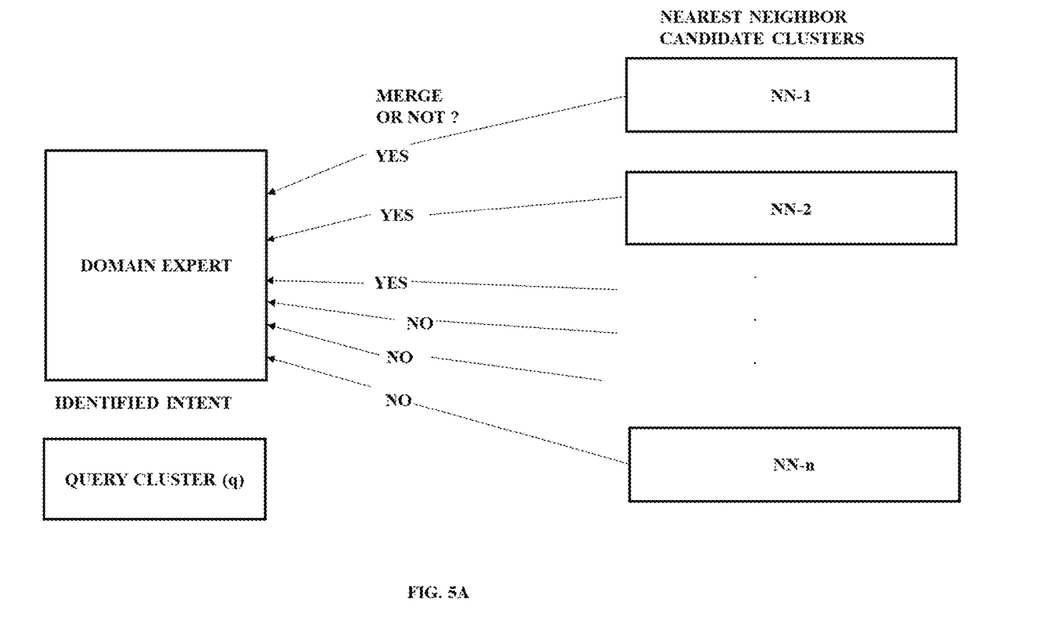
FIG. 5A illustrates a cluster merger algorithm in conjunction with the method for intent discovery from user logs using deep semi-supervised contrastive clustering, according to some embodiments of the present disclosure.

FIG. 5A illustrates a cluster merger algorithm/technique in conjunction with the method for intent discovery from user logs using deep semi-supervised contrastive clustering, according to some embodiments of the present disclosure. In an embodiment of the present disclosure, the cluster merging algorithm is executed iteratively on the generated plurality of clusters as represented by the cluster merger module 236. Further, for each of the cluster of the generated plurality of clusters (except the outlier cluster), the present disclosure (or the system 100) randomly samples p utterances and uses p utterances as cluster descriptions. The cluster representation is obtained as the mean of these utterance representations. It is to be noted that each of the cluster of the plurality of clusters contains its own cluster description and cluster representation. Further, one cluster of the plurality of clusters is randomly picked as a query cluster (q) and the corresponding nearest neighbors of the query cluster is obtained based on a cosine-similarity and asks, "Which of these clusters should be merged with q"? to a domain expert.

The cosine-similarity is determined between the cluster representation of the query cluster (q) and the corresponding cluster representation of the plurality of clusters. Based on the domain expert's response similar clusters are merged and the cluster representations are recalculated, and the cluster description of (q) is added to the newly created cluster. The cluster merger algorithm is repeated till the domain expert finds no candidate for thirty consecutive query clusters. One iteration of the cluster merging algorithm is illustrated in FIG. 5B.

Figure 5B:
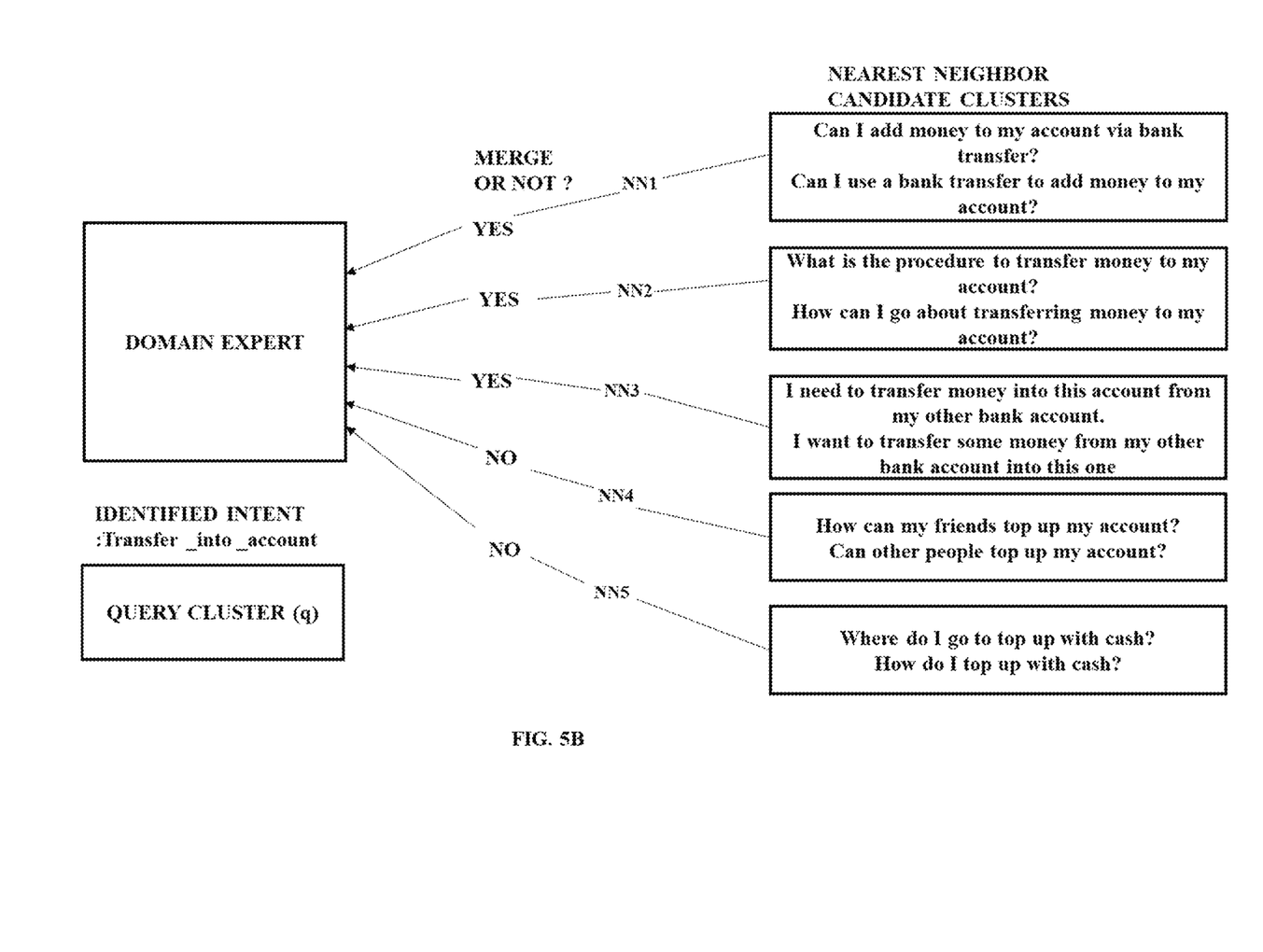
FIG. 5B shows a use case example illustrating a cluster merger algorithm in conjunction with the method for intent discovery from user logs using deep semi-supervised contrastive clustering, according to some embodiments of the present disclosure.

FIG. 5B shows a use case example illustrating a cluster merger algorithm in conjunction with the method for intent discovery from user logs using deep semi-supervised contrastive clustering, according to some embodiments of the present disclosure. Referring to FIG. 5B. In each iteration, the domain expert is shown (s=5) Candidate Clusters which are nearest neighbors of the query cluster (q), where per cluster, only (p=2) utterances are shown to the domain expert. And based on the reply from the domain expert, some candidate clusters are merged into the query cluster and the cluster definition is updated.

The method of the present disclosure was evaluated on five datasets with a varying number of intents. The Five datasets include BANKING77 (Reference link: https://ac-lanthology.org/2020.nlp4convai-1.5/) CLINC150 (Reference link: https://aclanthology.org/D19-1131/) (and CLINC150$_{OOS}$), SNIPS (Reference link: http://arxiv.org/abs/1805.10190), StackOverflow (Reference link: https://doi.org/10.3115/v1/W15-1509) and, DBPedia (Reference link: http://arxiv.org/abs/1502.01710). BANKING77 (known in art) is a fine-grained intent detection dataset from the banking domain comprising of 13,083 customer queries labelled with 77 intents.

CLINC150 (known in art) is a crowdsourced multi-domain (10 domains such as utility, travel etc.) intent detection dataset comprised of 23,700 queries with 22,500 in-scope queries labelled with 150 intents and 1,200 out-of-scope queries. The present disclosure uses both sets-CLINC150 which contains only in-scope queries, and CLINC150$_{OOS}$ which contains both in-scope and out-of-scope queries and use the balanced version of the dataset.

SNIPS (known in art) consist of 16000 crowd-sourced user utterances distributed across 7 intents. Out of 16 k, 14484 utterances have been used for experimental purpose in the past.

StackOverflow (known in art): This dataset was originally released as part of a kaggle competition. The dataset consists of 20,000 technical question titles distributed across 20 intents with 1 k questions per intent.

DBPedia (known in art) is an ontology classification dataset constructed by picking 14 non-overlapping classes from DBpedia 2014.

The present disclosure used Clustering Accuracy (ACC) (known in art), Normalized Mutual Information (NMI) and Adjusted Rand Index (ARI) as evaluation metrics. All metrics range from 0 to 100 and higher values of a metric indicate superior clustering results.

The present method was evaluated in a realistic scenario where the number of new intents is not known and known intent ratio (KIR)=75%. As shown in Table 1, 333 and 523.7 clusters are obtained after phase-2 of the method with average cluster purity of 96.96% and 98.30% corresponding to BANKING77 and CLINC150 respectively. Average purity refers to average clustering accuracy where ground-truth labels were used and based on majority voting, an intent label was assigned to the predicted cluster. For merging similar clusters, (s=5) is shown as candidate clusters per query to the domain expert who is asked to choose clusters that are similar to the query cluster. Here, ground truth cluster labels are used instead of the domain expert to answer these queries. For BANKING77 and CLINC150, 259.3 and 349.5 queries were required (avg over 10 runs) to merge similar clusters respectively where the domain expert had read 12 utterances (2 per cluster) per query. As a result, 81 and 152.59 clusters (intents) were obtained for BANKING77 and CLINC150 which were close to the actual number of intents i.e., 77 and 150 respectively. Then a classifier was trained with these intents and prediction was done on the test set. The present method achieved an ACC of 81.21% and 88.93% on BANKING77 and CLINC150 respectively which is significantly higher than the ACC of E2E (known in art). Also, the present method was able to discover all intents in the ground truth. Further the cluster merging strategy with E2E i.e., E2E+ present method was employed and got an improvement of 2% for CLINC150 but negative results for BANKING77. This is due to better initial cluster purity (P) of CLINC150 (i.e., 87.73%) versus BANKING77 (i.e., 79.92%), as the merging of noisy clusters intuitively leads to a decrease in ACC. This observation supports the fact that, for merging clusters by the domain expert, a good initial cluster purity is required. In table 1, P, Q refers to average cluster purity before merging and number of queries respectively. K' and $K_{pred}$ refers to the initial and final number of intents estimate by an algorithm. ACC and NMI refers to clustering accuracy and Normalized Mutual Information which are used to evaluate clustering performance.

TABLE 1

| | Approach | Q | P | K' | $K_{pred}$ | ACC | NMI |
|---|---|---|---|---|---|---|---|
| BANKING77 | E2E | 0 | NA | 231 | 96.8 | 72.93 | 84.97 |
| | E2E + Present method | 144.8 | 79.92 | 96.8 | 67 | 71.14 | 84 |
| | Present method | 259.3 | 96.96 | 333 | 81 | 81.21 | 87.35 |
| CLINC150 | E2E | 0 | NA | 450 | 190.1 | 84.59 | 93.64 |
| | E2E + Present method | 218.2 | 87.73 | 190.1 | 148.6 | 86.1 | 93.83 |
| | Present method | 349.5 | 98.3 | 523.7 | 152.6 | 88.93 | 95.19 |

The present disclosure follows the same pre-training steps outlined in the literature (Zhang et al. (2021c)) for phase-1. For the proposed approach/method, two different linear heads/layers were used one with dimension (d*(128)) for Instance-Level Contrastive Learning and second with dimension (d*(n)) for Supervised Representation Learning. For simulating a real-world problem of intent detection and discovery from user logs, the present disclosure used an experimental setting similar to the one outlined in the literature (Zhang et al. (2021c)) where they assumed that x % E {25%, 50%, 75%} of the total intents for a given dataset was known (this number is denoted by n by the present disclosure) where x is also referred to as the known intent ratio (KIR). The remaining number of intents (m) were considered novel. Accordingly, each dataset was divided into a $D_{train}$, $D_{val}$ and $D_{test}$ where $D_{train}$ contains 10% of labeled utterances per known intent and unlabeled utterances from both known and unknown intents. $D_{val}$, $D_{test}$ consists of utterances from known and new intents. The present disclosure performed two sets of experiments—one with a known value of n+m (number of total intents) and another one where the total number of intents is not known in advance. For a given dataset and KIR, the same experiment was run on ten different seeds and the average ACC, NMI, and ARI was reported on $D_{test}$. For the present method, the predictions were obtained from DBSCAN clustering after model convergence and inference were performed after running the cluster merger algorithm. The present disclosure used existing checkpoints of BERT-base-uncased (known in art) and stsb-roberta-base-v2 (known in art) as the PLM. The present disclosure (or the system 100) freezes all the parameters of PLM, but the last transformer layer parameters in the PLM for both phases to improve training efficiency and speed up the training process. Adam optimizer (as known in art) has been used to update PLM parameters and the learning rate has been set to 5e-5 for PLM, and 5e-3 for both heads in case of the present method. For all the experiments of the present disclosure, the batch size was kept at 400. For the present method, the minimum samples and epsilon for DBSCAN was kept as 3.0 and 0.09 respectively and ran all experiments on an Nvidia Titan A100 GPU. Classification accuracy on the $D_{val}$ was set for known intents as converge criteria for phase 1. For, phase-2 of the present method, converge was performed when the number of predicted clusters by DBSCAN clustering was minimum and used early stopping with a patience value of 20.0 for both phases. For semi-supervised contrastive representation learning, the contextual augmentor (known in art) was used to generate augmentations corresponding to unlabeled utterances where z % of the words in an utterance were substituted with similar words. A suitable value of z % was used for different datasets based on average utterance length which was done to preserve the semantics of an utterance while at the same time, substituting words in an utterance to create augmentations. The best results averaged over ten different seeds were reported based on the inference details. For the codebase, an existing SupContrast loss (known in art) in the semi-supervised setting is adopted and also utilized data creation steps from known method (Zhang et al. (2021c)).

The present disclosure used both inference strategies, i.e., DSSCC-KM (known in art) and DSSCC-CH (known in art) to obtain results for all experiments performed in conjunction with the proposed method and report ACC, NMI and ARI as shown in Table 2, 3 and 5. DSSCC-CH outperformed DSSCC-KM on CLINC150, SNIPS and StackOverflow whereas DSSCC-KM gave better results on BANKING77 and DBPedia. This inconsistency between the behaviour of DSSCC-CH and DSSCC-KM can be attributed to complexity of a given dataset, i.e., DSSCC-KM outperformed DSSCC-CH on BANKING77 (single domain dataset) and DBpedia whereas DSSCC-CH outperforms DSSCC-KM on CLINC150 (multi-domain dataset).

The present disclosure reports ACC, NMI and ARI on CLINC150 and BANKING77 datasets in the semi-supervised scenario for three different known intent ratios (KIR)

as depicted in table 2. Except K-means$_{SBERT}$ (known in art) and SCCL (known in art), all baseline results from literature (Zhang et al. (2021c)) is considered and for fair comparison BERT (known in art) is used as PLM in DSSCC.

| KIR | Approach | CLINC-150 ACC | NMI | ARI | BANKING77 ACC | NMI | ARI |
|---|---|---|---|---|---|---|---|
| | K - means$_{BERT}$ | 45.06 | 70.89 | 26.86 | 29.55 | 54.57 | 12.18 |
| | K - means$_{BERT}$ | 61.04 | 82.22 | 48.56 | 55.72 | 74.68 | 42.77 |
| | AG | 44.03 | 73.07 | 27.7 | 31.58 | 57.07 | 13.31 |
| 0.00% | SAE-KM | 46.75 | 73.13 | 29.95 | 38.92 | 63.79 | 22.85 |
| | DEC | 46.89 | 74.83 | 27.46 | 41.29 | 67.78 | 27.21 |
| | DCN | 49.29 | 75.66 | 31.15 | 41.99 | 67.54 | 26.81 |
| | DAC | 55.94 | 78.4 | 40.49 | 27.41 | 47.35 | 14.24 |
| | DeepCluster | 35.7 | 65.58 | 19.11 | 20.69 | 41.77 | 8.95 |
| | SCCL | 33.52 | 66.63 | 18.89 | 13.41 | 34.14 | 4.02 |
| | PCK-means | 54.51 | 68.71 | 35.38 | 32.66 | 48.22 | 16.24 |
| | BERT-KCL | 24.72 | 65.74 | 17.97 | 22.11 | 52.42 | 15.75 |
| | BERT-MCL | 24.35 | 65.06 | 16.82 | 22.07 | 51.96 | 13.94 |
| 25.00% | BERT-DTC | 49.1 | 74.17 | 33.05 | 25.24 | 48.58 | 13.32 |
| | CDAC+ | 64.64 | 84.25 | 50.35 | 48.71 | 69.78 | 35.09 |
| | DeepAligned | 73.71 | 88.71 | 64.27 | 48.88 | 70.45 | 36.81 |
| | DSSCC$_{BERT}$ | 75.72 | 89.12 | 66.72 | 55.52 | 72.73 | 42.11 |
| | PCK-means | 54.51 | 68.62 | 35.23 | 32.26 | 48.11 | 16.02 |
| | BERT-KCL | 46.91 | 78.45 | 37.94 | 40.97 | 65.22 | 30.93 |
| | BERT-MCL | 47.21 | 78.39 | 36.72 | 41.43 | 65.68 | 28.87 |
| 50.00% | BERT-DTC | 71.68 | 86.2 | 59.62 | 53.59 | 71.4 | 40.65 |
| | CDAC+ | 69.02 | 86.18 | 54.15 | 53.34 | 71.53 | 40.42 |
| | DeepAligned | 80.22 | 91.63 | 72.34 | 59.23 | 76.52 | 47.82 |
| | DSSCC$_{BERT}$ | 81.46 | 91.39 | 73.48 | 63.08 | 77.6 | 50.64 |
| | PCK-means | 54.61 | 68.7 | 35.4 | 32.66 | 48.22 | 16.24 |
| | BERT-KCL | 68.86 | 86.82 | 58.79 | 60.15 | 75.21 | 46.72 |
| | BERT-MCL | 69.66 | 87.72 | 59.92 | 61.14 | 75.68 | 47.43 |
| 75.00% | BERT-DTC | 80.73 | 90.41 | 70.92 | 56.51 | 76.55 | 44.7 |
| | CDAC+ | 69.89 | 86.65 | 54.33 | 53.83 | 72.25 | 40.97 |
| | DeepAligned | 86.01 | 94.03 | 79.82 | 64.9 | 79.56 | 53.64 |
| | DSSCC$_{BERT}$ | 87.91 | 93.87 | 81.09 | 69.82 | 81.24 | 58.09 |

Table 2 reports ACC, NMI and ARI on CLINC150 and BANKING77 datasets in the semi-supervised scenario for three different known intent ratios (KIR).

Table 3 depicts an intent detection and discovery results on three datasets, i.e., SNIPS, StackOverflow and DBPedia where the results corresponding to DeepAligned$_{BERT}$ (DA$_{BERT}$) (known in art), DeepAligned$_{SBERT}$ (DAS$_{BERT}$) (known in art), were computed using code provided by literature (Zhang et al. (2021c)) and user SBERT as PLM in DSSCC.

TABLE 3

Intent detection and discovery results on three datasets, i.e., SNIPS, StackOverflow and DBPedia

| KIR | Approach | SNIPS ACC | NMI | ARI | StackOverflow ACC | NMI | ARI | DBPedia ACC | NMI | ARI |
|---|---|---|---|---|---|---|---|---|---|---|
| | DA$_{BERT}$ | 86.21 | 80.42 | 74.7 | 69.66 | 70.23 | 53.69 | 85.89 | 88.98 | 79.22 |
| 25.00% | DA$_{SBERT}$ | 81.16 | 77.33 | 68.38 | 72.64 | 73.43 | 58.3 | 83.7 | 85.4 | 75.67 |
| | DSSCC$_{SBERT}$ | 94.33 | 89.3 | 87.9 | 81.72 | 76.57 | 68 | 89.44 | 89.25 | 83.29 |
| | DA$_{BERT}$ | 85.69 | 83.03 | 77.03 | 72.89 | 74.49 | 57.96 | 88.63 | 91.24 | 83.38 |
| 50.00% | DA$_{SBERT}$ | 88.83 | 84.19 | 79.53 | 73.07 | 74.08 | 59.34 | 87.29 | 88.8 | 81.04 |
| | DSSCC$_{SBERT}$ | 95.2 | 91.07 | 89.67 | 82.43 | 77.3 | 68.94 | 92.14 | 92.7 | 88.61 |
| | DA$_{BERT}$ | 90.1 | 86.94 | 82.42 | 74.51 | 76.24 | 59.45 | 92.17 | 93.25 | 88.12 |
| 75.00% | DA$_{SBERT}$ | 92.7 | 88.22 | 85.4 | 75.5 | 75.9 | 61.21 | 91.17 | 91.14 | 85.94 |
| | DSSCC$_{SBERT}$ | 94.87 | 90.44 | 89.03 | 82.65 | 77.08 | 68.67 | 92.73 | 92.58 | 88.55 |

Table 4 depicts performance of different approaches on different known intent ration on CLINC150 and BANKING77 dataset.

TABLE 4

DA vs DSSCC with BERT and SBERT as PLM

| KIR | | CLINC150 ACC | NMI | ARI | BANKING77 ACC | NMI | ARI |
|---|---|---|---|---|---|---|---|
| | DA$_{BERT}$ | 73.71 | 88.71 | 64.27 | 48.88 | 70.45 | 36.81 |
| | DA$_{SBERT}$ | 67.78 | 86.5 | 57.1 | 57 | 75 | 45.8 |
| 25.00% | DSSCC$_{BERT}$ | 75.72 | 89.12 | 66.72 | 55.52 | 72.73 | 42.11 |
| | DSSCC$_{SBERT}$ | 80.36 | 91.43 | 72.83 | 64.93 | 80.17 | 53.6 |
| | DA$_{BERT}$ | 80.22 | 91.63 | 72.34 | 59.23 | 76.52 | 47.82 |
| | DA$_{SBERT}$ | 77.69 | 91.4 | 70.9 | 64.14 | 79.3 | 52.7 |
| 50.00% | DSSCC$_{BERT}$ | 81.46 | 91.39 | 73.48 | 63.08 | 77.6 | 50.64 |
| | DSSCC$_{SBERT}$ | 83.49 | 92.78 | 76.8 | 69.38 | 82.68 | 58.95 |
| | DA$_{BERT}$ | 86.01 | 94.03 | 79.82 | 64.9 | 79.56 | 53.64 |
| | DA$_{SBERT}$ | 85.89 | 94.2 | 79.83 | 74.08 | 83.8 | 63.3 |
| 75.00% | DSSCC$_{BERT}$ | 87.91 | 93.87 | 81.09 | 69.82 | 81.24 | 58.09 |
| | DSSCC$_{SBERT}$ | 88.47 | 94.5 | 82.4 | 75.15 | 85.04 | 64.83 |

Table 5 depicts an intent detection and discovery with unknown value of m for KIR=75%. The results corresponding to DeepAligned$_{BERT}$ (DA$_{BERT}$) (known in art), DeepAligned$_{SBERT}$ (DAS$_{BERT}$) (known in art), were obtained using code known in literature (Zhang et al. (2021c)) with SBERT as the PLM.

TABLE 5

Intent detection and discovery with unknown value of m for KIR = 75%.

| | | CLINC150 | | | | | BANKING77 | | | |
|---|---|---|---|---|---|---|---|---|---|---|
| Approach | K' | $K_{pred}$ | ACC | NMI | ARI | K' | $K_{pred}$ | ACC | NMI | ARI |
| $DA_{BERT}$ | 300 | 130 | 77.18 | 92.5 | 72.26 | 154 | 65.1 | 62.49 | 78.88 | 51.71 |
| $DA_{SBERT}$ | 300 | 129.6 | 76.87 | 92.61 | 72.05 | 154 | 66.9 | 63.53 | 80.84 | 53.26 |
| $DSSCC_{SBERT}$ | 300 | 129.6 | 81.37 | 92.7 | 75.49 | 154 | 66.9 | 71.77 | 84.29 | 62.13 |
| $DA_{BERT}$ | 450 | 189.2 | 83.81 | 93.57 | 79.54 | 231 | 99.3 | 63.98 | 79.93 | 53.76 |
| $DA_{SBERT}$ | 450 | 190.1 | 82.57 | 93.85 | 79.28 | 231 | 96.8 | 66.2 | 82.11 | 56.98 |
| $DSSCC_{SBERT}$ | 450 | 190.1 | 84.59 | 93.64 | 80.44 | 231 | 96.8 | 72.93 | 84.97 | 64.65 |
| $DA_{BERT}$ | 600 | 258.6 | 72.22 | 91.8 | 70.91 | 308 | 121.9 | 61.05 | 79.95 | 53.1 |
| $DA_{SBERT}$ | 600 | 255.9 | 72.29 | 92.18 | 71.38 | 308 | 118.1 | 62.67 | 82.05 | 55.75 |
| $DSSCC_{SBERT}$ | 600 | 255.9 | 80.83 | 92.04 | 76.28 | 308 | 118.1 | 67.56 | 84.43 | 61.87 |

Hence, the present disclosure provides a system and method for intent discovery from user logs using deep semi-supervised contrastive clustering. The proposed approach optimally utilizes both labeled and unlabeled utterances to outperform existing state-of-the-art (SOTA) approaches which does not require an estimate of new intents. The present method does not need to estimate the number of new intents and yields the plurality of clusters which are merged by domain experts based on the cluster descriptions.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for new intent discovery, comprising:
   receiving, via one or more hardware processors, a plurality of labeled utterances specific to a plurality of known intents obtained from a domain expert;
   updating, via the one or more hardware processors, one or more parameters of a pre-trained language model (PLM) based on the received plurality of labeled utterances to obtain a fine-tuned pre-trained language model (PLM) by minimizing a cross-entropy loss over a batch B of size N consisting of the plurality of labeled utterances;
   iteratively performing, via the one or more hardware processors, a representation learning and clustering using the plurality of labeled utterances and a plurality of unlabeled utterances from the plurality of known intents and the plurality of unlabeled utterances from a plurality of unknown intents for:
      (i) fine-tuning the pre-trained language model (PLM) using a combination of a semi-supervised contrastive loss at an utterance level and the cross-entropy loss; and
      (ii) generating a plurality of clusters by running a clustering algorithm wherein, the plurality of clusters comprises an outlier cluster and wherein, each of the cluster of the plurality of clusters comprises of a corresponding cluster representation;
   executing, via the one or more hardware processors, a cluster merger algorithm iteratively on the generated plurality of clusters based on a plurality of cluster definitions, wherein a plurality of p utterances from each of the plurality of clusters are used as a plurality of cluster definitions comprising:
      (i) obtaining a query cluster (q) by randomly selecting one cluster from the plurality of clusters and obtaining a corresponding plurality of nearest neighbors based on a cosine-similarity, wherein the cosine-similarity is determined between the cluster representation of the query cluster (q) and the corresponding cluster representation of the plurality of clusters;
      (ii) obtaining a response for merging the query cluster (q) and the corresponding plurality of nearest neighbors and creating one or more new clusters based on the response; and
      (iii) recalculating the corresponding cluster representation and assigning a cluster definition of the query cluster (q) to the one or more new clusters; and
   interpreting, via the one or more hardware processors, each of the one or more new clusters as an intent and training a logistic classifier based on the intent to obtain the plurality of labelled utterances that belong to the outlier cluster.

2. The processor implemented method of claim 1, wherein the plurality of unknown intents is received from a plurality of user logs, wherein the plurality of user logs comprises one or more conversations between a user and a user interface, and wherein the one or more parameters of the pre-trained language model (PLM) comprises one or more real valued vectors.

3. The processor implemented method of claim 1, wherein the cluster representation is obtained as a mean of the plurality of labeled utterances and the plurality of unlabeled utterances obtained from the plurality of clusters, and wherein each of the plurality of labeled utterances and each of the plurality of unlabeled utterances is represented by the one or more real valued vectors obtained from the pre-trained language model (PLM).

4. The processor implemented method of claim 1, wherein the cluster definition is a set of natural language sentences which describes each of the plurality of clusters.

5. The processor implemented method of claim 1, wherein the clustering algorithm includes a density-based spatial clustering of applications with noise (DBSCAN) algorithm.

6. The processor implemented method of claim 1, wherein the outlier cluster comprises of the plurality of unlabeled utterances from the plurality of different known intents and the plurality of different unknown intents, and further comprises of the plurality of unlabeled utterances which does not satisfy the criteria of the clustering algorithm.

7. A system for new intent discovery, comprising:
   a memory storing instructions;
   one or more communication interfaces; and
   one or more hardware processors coupled to the memory via the one or more communication interfaces, wherein the one or more hardware processors are configured by the instructions to:
   receive a plurality of labeled utterances specific to a plurality of known intents obtained from a domain expert;
   update one or more parameters of a pre-trained language model (PLM) based on the received plurality of labeled utterances to obtain a fine-tuned pre-trained language model (PLM) by minimizing a cross-entropy loss over a batch B of size N consisting of the plurality of labeled utterances;
   iteratively perform a representation learning and clustering using the plurality of labeled utterances and a plurality of unlabeled utterances from the plurality of known intents and the plurality of unlabeled utterances from a plurality of unknown intents for:
      (i) fine-tuning the pre-trained language model (PLM) by using a combination of a semi-supervised contrastive loss at an utterance level and the cross-entropy loss; and
      (ii) generating a plurality of clusters by running a clustering algorithm wherein, the plurality of clusters comprises an outlier cluster and wherein, each of the cluster of the plurality of clusters comprises of a corresponding cluster representation;
   execute a cluster merger algorithm iteratively on the generated plurality of clusters based on a plurality of cluster definitions, wherein a plurality of p utterances from each of the plurality of clusters are used as a plurality of cluster definitions further comprising:
      (i) obtaining a query cluster (q) by randomly selecting one cluster from the plurality of clusters and obtaining a corresponding plurality of nearest neighbors based on a cosine-similarity, wherein the cosine-similarity is determined between the cluster representation of the query cluster (q) and the corresponding cluster representation of the plurality of clusters;
      (ii) obtaining a response for merging the query cluster (q) and the corresponding plurality of nearest neighbors and creating one or more new clusters based on the response; and
      (iii) recalculating the corresponding cluster representation and assigning a cluster definition of the query cluster (q) to the one or more new clusters; and
   interpret each of the one or more new clusters as an intent and training a logistic classifier based on the intent to obtain the plurality of labelled utterances that belong to the outlier cluster.

8. The system of claim 7, wherein the plurality of unknown intents is received from a plurality of user logs, wherein the plurality of user logs comprises one or more conversations between a user and a user interface, and wherein the one or more parameters of the pre-trained language model (PLM) comprises one or more real valued vectors.

9. The system of claim 7, wherein the cluster representation is obtained as a mean of the plurality of labeled utterances and the plurality of unlabeled utterances obtained from the plurality of clusters, and wherein each of the plurality of labeled utterances and each of the plurality of unlabeled utterances is represented by the one or more real valued vectors obtained from the pre-trained language model (PLM).

10. The system of claim 7, wherein the cluster definition is a set of natural language sentences which describes each of the plurality of clusters.

11. The system of claim 7, wherein the clustering algorithm includes a density-based spatial clustering of applications with noise (DBSCAN) algorithm.

12. The system of claim 7, wherein the outlier cluster comprises of the plurality of unlabeled utterances from the plurality of different known intents and the plurality of different unknown intents, and further comprises of the plurality of unlabeled utterances which does not satisfy the criteria of the clustering algorithm.

13. One or more non-transitory machine-readable information storage mediums for new intent discovery, comprising one or more instructions which when executed by one or more hardware processors cause:
  receiving a plurality of labeled utterances specific to a plurality of known intents obtained from a domain expert;
  updating one or more parameters of a pre-trained language model (PLM) based on the received plurality of labeled utterances to obtain a fine-tuned pre-trained language model (PLM) by minimizing a cross-entropy loss over a batch B of size N consisting of the plurality of labeled utterances;
  iteratively performing a representation learning and clustering using the plurality of labeled utterances and a plurality of unlabeled utterances from the plurality of known intents and the plurality of unlabeled utterances from a plurality of unknown intents for:
    (i) fine-tuning the pre-trained language model (PLM) using a combination of a semi-supervised contrastive loss at an utterance level and the cross-entropy loss; and
    (ii) generating a plurality of clusters by running a clustering algorithm wherein, the plurality of clusters comprises an outlier cluster and wherein, each of the cluster of the plurality of clusters comprises of a corresponding cluster representation;
  executing a cluster merger algorithm iteratively on the generated plurality of clusters based on a plurality of cluster definitions, wherein a plurality of p utterances from each of the plurality of clusters are used as a plurality of cluster definitions further comprising:
    (i) obtaining a query cluster (q) by randomly selecting one cluster from the plurality of clusters and obtaining a corresponding plurality of nearest neighbors based on a cosine-similarity, wherein the cosine-similarity is determined between the cluster representation of the query cluster (q) and the corresponding cluster representation of the plurality of clusters;
    (ii) obtaining a response for merging the query cluster (q) and the corresponding plurality of nearest neighbors and creating one or more new clusters based on the response; and
    (iii) recalculating the corresponding cluster representation and assigning a cluster definition of the query cluster (q) to the one or more new clusters; and
  interpreting each of the one or more new clusters as an intent and training a logistic classifier based on the intent to obtain the plurality of labelled utterances that belong to the outlier cluster.

14. The one or more non-transitory machine-readable information storage mediums of claim 13, wherein the plurality of unknown intents is received from a plurality of user logs, wherein the plurality of user logs comprises one or more conversations between a user and a user interface, and wherein the one or more parameters of the pre-trained language model (PLM) comprises one or more real valued vectors.

15. The one or more non-transitory machine-readable information storage mediums of claim 13, wherein the cluster representation is obtained as a mean of the plurality of labeled utterances and the plurality of unlabeled utterances obtained from the plurality of clusters, and wherein each of the plurality of labeled utterances and each of the plurality of unlabeled utterances is represented by the one or more real valued vectors obtained from the pre-trained language model (PLM).

16. The one or more non-transitory machine-readable information storage mediums of claim 13, wherein the cluster definition is a set of natural language sentences which describes each of the plurality of clusters.

17. The one or more non-transitory machine-readable information storage mediums of claim 13, wherein the clustering algorithm includes a density-based spatial clustering of applications with noise (DBSCAN) algorithm.

18. The one or more non-transitory machine-readable information storage mediums of claim 13, wherein the outlier cluster comprises of the plurality of unlabeled utterances from the plurality of different known intents and the plurality of different unknown intents, and further comprises of the plurality of unlabeled utterances which does not satisfy the criteria of the clustering algorithm.

* * * * *